3,075,845
NEWSINKS HAVING EXCELLENT RUB-OFF
CHARACTERISTICS
Philip H. Goulston, Peabody, and John F. Hardy, Andover, Mass., assignors to Cabot Corporation, Boston, Mass., a corporation of Delaware
No Drawing. Filed May 5, 1960, Ser. No. 26,936
4 Claims. (Cl. 106—31)

This invention relates to inks and in particular to newsinks containing large quantities of oil furnace carbon black.

Channel carbon blacks have historically been utilized as the pigment in newsink formulations. With the advent of furnace carbon blacks, it was hoped that furnace blacks would replace the more costly channel carbon blacks in newsinks. Unfortunately, however, the use of furnace carbon blacks in a conventional newsink formulation produces a newsink having objectionable rub-off characteristics. Moreover, the rub-off characteristics of such links become increasingly objectionable with increasing furnace carbon black loading. Accordingly, furnace carbon blacks have heretofore been utilized in newsinks only in moderate quantities, and with reluctance. The newsinks of the present invention, however, although they contain large quantities of furnace carbon black, nevertheless are not subject to excessive rub-off.

Accordingly, it is a principal object of the present invention to provide improved newsinks.

It is another object of this invention to provide newsinks containing oil furnace carbon black which have excellent rub-off characteristics.

Other objects will in part be obvious and will in part appear hereinafter.

In accordance with the present invention, it was discovered that the rub-off characteristics of a newsink containing oil furnace carbon black are surprisingly improved when at least about 1% by weight of the contained oil furnace carbon black, of a paraffin wax having a melting point between about 120 and 155° F. is added to the newsink. The reason for the unexpected improvement is not completely understood, but it is believed, and there is no intention to be bound by this explanation, that the paraffin wax coats the surface of the oil furnace carbon black particles, thereby decreasing the tendency of said particles to rub off.

In general, any of the paraffin waxes described or mentioned in "The Chemistry and Technology of Waxes," by Albin H. Warth, Second Edition, published by Reinhold Publishing Corp., New York, in 1956, which melt within the aforementioned range are suitable for the purposes of the present invention. In addition, waxy substances or blends or mixtures of waxes, at least 50% by weight of the waxy portion of which is paraffin wax having a melting point between about 120° and 155° F. are likewise suitable for the purposes of the present invention. For example, most petrolatums are suitable for use in the present invention.

It has been found that the rub-off characteristics of newsinks comprising furnace carbon black and any type of vehicle based on mineral oil can be improved by the addition thereto of paraffin waxes. Accordingly, any type of mineral oil can be utilized as the vehicle base in the newsinks of the present invention. For example, low and high viscosity mineral oils are both generally suitable for the purposes of the present invention.

The maximum quantity of paraffin wax that can be utilized is not critical but quantities greater than about 8% by weight based on the furnace carbon black pigment will seldom be utilized because little or no additional improvement in rub-off characteristics is achieved by additional amounts, and, of course, it is economically disadvantageous to pay for ineffective additives.

In addition to a vehicle, oil furnace carbon black, and paraffin wax, the newsinks of the present invention may contain any of the other ingredients normally utilized in newsinks such as channel carbon black, gas furnace carbon black and flow improving agents, such as gilsonite.

The particle size of the oil furnace carbon black utilized is not critical although blacks having a particle size of less than about 100 millimicrons are generally preferred.

Likewise the oil furnace carbon black content of the inks of the present invention is not critical. Newsinks generally contain between about 8 and 16 parts by weight of the ink vehicle, of carbon black, which may be all furnace carbon black, all channel carbon black, partially gas furnace carbon black, or a combination thereof. The present invention, however, is primarily directed to newsinks containing at least about 2 parts and preferably 4 parts by weight of the vehicle of oil furnace carbon blacks.

There follow a number of non-limiting illustrative examples:

*Examples 1–6*

There was made up an ink composition consisting of 450 grams of "F–87," a low viscosity mineral oil containing about 2% gilsonite produced by Sun Chemical Co., and 50 grams of "Elftex–8," an oil furnace carbon black produced by Cabot Carbon Co., and having a particle size of about 29 millimicrons. This composition was divided into six equal portions to each of five of which was introduced an additive as indicated in the table below. Subsequently, each portion was heated to 180° F. and the mixture stirred for 3 minutes at maximum speed in an Eppenbach mixer. On cooling, 8 drawdowns of each portion were made with a 0.0015 inch drawdown blade on newsprint paper. After drying, each drawdown was given a code number, and a finger tip smear test was made and transferred onto Scotch tape which was then mounted on microslides for visual observation by a panel of four experts skilled in the art of evaluating the rub-off of newsinks. The results follow. A value of 50% indicates no visual difference between the control and the sample. A value of less than 50% indicates that visually the smear test appeared darker than the control and that therefore rub-off of that sample was greater than that of the control. A value of more than 50% indicates that the smear test appeared lighter than the control and that therefore rub-off of that sample was less than that of the control.

The results were as follows:

| Wax Additive | Quantity of Additive (in percent by weight of furnace black contained) | Result, percent |
|---|---|---|
| 1. Control | | 50 |
| 2. Carnauba (vegetable) melting point 180° F | 5 | 16.6 |
| 3. Candelilla wax melting point 160° F | 5 | 47 |
| 4. Sunoco 5512 (mineral) produced by Sun Oil Co. melting point about 155° F | 5 | 57 |
| 5. "Pet Red Vet," a petrolatum (comprising about 50% mineral oil and 50% paraffin wax melting at about 135° F.) produced by Gulf Oil Corp | 2 | 61 |
| 6. Petrolatum (the same as utilized in Example 5) | 10 | 72 |

It can be seen from the above data that in every case, the paraffin waxes substantially decreased rub-off, whereas, surprisingly, carnauba and candelilla waxes increased rub-off.

Obviously many changes may be made in the above description and examples without departing from the scope of the invention. For example, mixtures of individually suitable paraffin waxes are also suitable for use in the present invention.

What we claim is:

1. A newsink having excellent rub-off characteristics which comprises mineral oil, oil furnace carbon black, and at least 1% by weight of said oil furnace carbon black of paraffin wax, having a melting point between about 120° F. and 155° F.

2. The newsink of claim 1 wherein said oil furnace carbon black comprises at least about 25% by weight of the total quantity of carbon black contained in said newsink.

3. The newsink of claim 1 wherein said oil furnace carbon black comprises at least about 50% by weight of the total quantity of carbon black contained in said newsink.

4. A newsink having excellent rub-off characteristics which comprises mineral oil, oil furnace carbon black, and sufficient petrolatum comprising at least about 25% by weight paraffin wax having a melting point between about 120° and 155° F. to provide between about 1% and 8% by weight of said oil furnace carbon black of said paraffin wax.

References Cited in the file of this patent

UNITED STATES PATENTS 2,891,872     Voet _____ June 23, 1959

OTHER REFERENCES

Ellis: "Printing Inks" (1940), published in N.Y.C. by Reinhold (pages 116, 211 and 480).

Meyer: American Ink Maker, December 1958, vol. 36 (pages 37, et seq.), "Petroleum and Printing Ink."